Patented Nov. 7, 1933

1,933,977

UNITED STATES PATENT OFFICE 1,933,977

DENTIFRICE PREPARATION

John J. Harris, Chicago, Ill.

No Drawing. Application November 10, 1927
Serial No. 232,477

5 Claims. (Cl. 167—93)

The present invention relates to improvements in dentifrice preparations, such as tooth pastes, or washes, and will be fully understood from the following description thereof, in which specific examples of preparations embodying the present invention are given by way of example.

I have discovered that the application to the teeth and gums of dispersions of highly colloidal clays of the type of bentonite in the usual manner is highly effective in cleansing the surfaces of the teeth, notwithstanding the non-abrasive character of the bentonite applied.

In preparing dentifrice preparations in accordance with my invention, I employ sterile dispersions of bentonite produced by boiling the bentonite with suitable quantities of water, smaller quantities of water being employed when pastes or paste-like preparations are desired. I may likewise incorporate suitable mild soaps into the paste; however, I have found that fatty oils may be effectively dispersed through the mixture by the action of the bentonite and when so dispersed, exert an effect similar to that of soap, particularly in forming lather in use.

In preparing a paste-like preparation, I may employ from two to six parts of water to one part of bentonite. Any desired proportion of soap or preferably oil may be incorporated in the mixture to produce a lathering effect, if such effect is desired. Thus, from 2 to 15% of a suitable fatty oil, such as corn oil, olive oil, cotton-seed oil, olein or the like may be employed. Thus, in preparing a paste in accordance with my invention, I may mix 1 lb. of bentonite with 3 lbs. of water, boiling the mixture and incorporating therein 4% of corn oil togther with minute amounts of sweetening and flavoring agents, such as saccharine, oil of wintergreen, oil of spearmint or the like. Inert materials, mild abrasives, or chemicals having desired special actions may be incorporated in the mixture, if desired.

In preparing a mouth wash, the proportion of water may be from 70 to 99 parts of water to 1 part of bentonite. I prefer to employ about 95 parts by weight of water and 5 parts by weight of bentonite, the mixture being boiled to effect its sterilization and small amounts of flavoring materials, such as saccharine, spearmint or the like being added. Oil of eucalyptus, thymol or other like material having a tendency to prevent bacterial growth may likewise be included in the mix.

I claim:

1. A dentifrice preparation in paste form consisting substantially entirely of a sterile dispersion of bentonite in an aqueous vehicle, and a fatty oil dispersed therethrough.

2. A dentifrice preparation in paste form consisting substantially entirely of from 3 to 6 parts of water, 1 part of bentonite and 2 to 15% of fatty oil.

3. A dentifrice preparation whose essential ingredient is bentonite.

4. A dentifrice preparation whose essential ingredient is a sterile dispersion of bentonite in an aqueous vehicle.

5. A dentifrice preparation in paste form consisting substantially entirely of a sterile dispersion of bentonite in an aqueous vehicle.

JOHN J. HARRIS.